United States Patent [19]
Ohmura et al.

[11] 4,032,752
[45] June 28, 1977

[54] HEATING ELEMENTS COMPRISING A PTC CERAMIC ARTICLE OF A HONEYCOMB STRUCTURE COMPOSED OF BARIUM TITANATE

[75] Inventors: Akira Ohmura, Nagoya; Shigetaka Wada, Kuwana, both of Japan

[73] Assignee: NGK Insulators, Ltd., Nagoya, Japan

[22] Filed: Aug. 23, 1976

[21] Appl. No.: 716,713

[30] Foreign Application Priority Data

Sept. 3, 1975  Japan .......................... 50-106033

[52] U.S. Cl. ............................. 219/541; 219/553; 219/381; 338/22 R; 338/283; 338/323; 338/327; 252/518

[51] Int. Cl.² ......................................... H05B 3/08

[58] Field of Search .......... 219/307, 374, 381, 382, 219/541, 538, 543, 552, 553; 13/25; 338/22 R, 223, 283, 292, 294, 323, 327, 332; 252/514, 518, 520

[56] References Cited

UNITED STATES PATENTS

| | | | |
|---|---|---|---|
| 3,163,841 | 12/1964 | Willet | 338/292 |
| 3,927,300 | 12/1975 | Wada et al. | 219/381 |
| 3,956,614 | 5/1976 | Hervert | 219/541 |
| 3,982,100 | 9/1976 | Hervert | 219/553 |

*Primary Examiner*—Volodymyr Y. Mayewsky
*Attorney, Agent, or Firm*—Stevens, Davis, Miller & Mosher

[57] ABSTRACT

Heating elements comprising a ceramic article of a honeycomb structure having a positive temperature coefficient of electric resistance and composed of barium titanate are provided with channels, in which a pair of ohmic electrodes consisting mainly of silver as a metallic component and having a surface resistivity of the electrode per se of not more than 10 mΩ/cm² are provided on both end surfaces thereof and the ohmic electrodes are coated with an electrical insulating and thermostable material.

11 Claims, 4 Drawing Figures

HEATING ELEMENTS COMPRISING A PTC CERAMIC ARTICLE OF A HONEYCOMB STRUCTURE COMPOSED OF BARIUM TITANATE

BACKGROUND OF THE INVENTION

1. Field of the Invention

The present invention relates to heating elements and more particularly to heating elements comprising a ceramic article of a honey comb structure having a positive temperature coefficient of electric resistance (hereinafter referred to as a PTC ceramic article) and composed of barium titanate, which is provided with a pair of ohmic electrodes consisting mainly of silver as a metallic component on both end surfaces of the ceramic honeycomb.

In the remainder of the specification, the term "honeycomb structure" shall be understood to mean a structure having a multiplicity of parallel channels extending therethrough with each of said channels being bounded by a partition wall which is substantially uniform in thickness, and having a surface-to-volume ratio in the range of 10 to 60 cm$^2$/cm$^3$.

2. Description of the Prior Art

Heretofore, a baked paste consisting mainly of silver as a metallic component has been generally known as the ohmic electrode for a plate-shaped PTC ceramic article composed of barium titanate.

U.S. Pat. No. 3,927,300 granted on Dec. 16, 1975 to S. Wada et al has disclosed a heating element in which a pair of ohmic electrodes composed of the conventional baked silver paste are provided on the opposite end surfaces 3 and 3' of PTC ceramic article 1 of a honeycomb structure composed of barium titanate and having a multiplicity of parallel channels 2 extending therethrough as shown in FIG. 1, but there has been a defect that in this heating element, the resistance of the ohmic electrodes per se increases during flowing electric current and cracks are formed on the electrodes and the ohmic electrodes are fused and broken in a short time and such a heating element has not been practically used.

Therefore, the inventors have proposed in the above described patent that aluminum be hot sprayed on the opposite end surfaces 3 and 3' of the channels in PTC ceramic article 1 of the honeycomb structure composed of barium titanate to form the ohmic electrodes. But with aluminum it is difficult to provide a lead wire, and in the hot spraying process, the sprayed aluminum is adhered to the inner portion of the channels 2 and the cross-sectional area of the channels becomes small, this process is not preferable.

Furthermore, the above described U.S. patent discloses that a corrosion resistant material is coated on the whole heating element, but this only attempts electrical insulation against the electrically conductive fluid to be heated, such as water and such a disclosure has no relation to the subject matter of the present invention.

SUMMARY OF THE INVENTION

The present invention is based on the discovery that the ohmic electrode consisting mainly of silver as a metallic component in which the surface resistivity of the electrode per se is not more than 10 mΩ/cm$^2$, preferably not more than 5 mΩ/cm$^2$ is preferred as the electrode to be provided to the heating element of PTC ceramic article of a honeycomb structure composed of barium titanate.

Furthermore, the present invention is also based on the discovery of the unexpected results explained in detail hereinafter that the migration of silver which is the main component of the electrode is prevented and the breakage of the electrode is prevented by applying an electrical insulating and thermostable coating on the electrodes.

Accordingly, an object of this invention is to provide a heating element of PTC ceramic article for a honeycomb structure composed of barium titanate in which the resistance of the ohmic electrode per se does not increase during use, and, therefore, which can be stably used for a long time.

Another object of this invention is to provide a heating element comprising a PTC ceramic article of a honeycomb structure composed of barium titanate, which is provided with a pair of ohmic electrodes which do not cause the silver migration during use.

Other object of this invention is to provide a heating element comprising a PTC ceramic article of a honeycomb structure of barium titanate, which does not cause cracks on the electrode during use. dr

DETAILED DESCRIPTION OF THE INVENTION

The heating elements of the present invention will be explained in detail with reference to the drawings.

Figure 1:
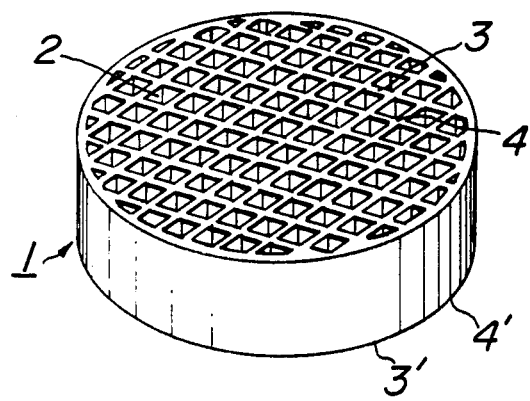
FIG. 1 is a perspective view of a PTC ceramic article of a honeycomb structure composed of barium titanate.
Figure 2:
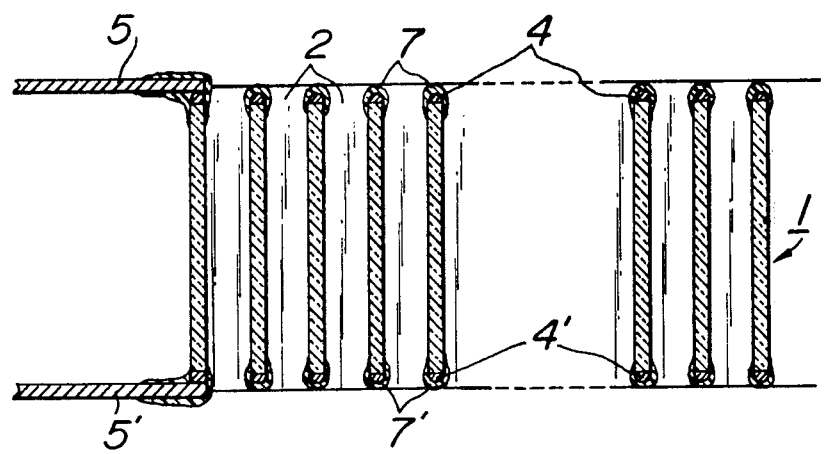
FIG. 2 is an enlarged cross-sectional view of a heating element of the present invention, to which lead electrodes are soldered, a part of which is omitted.
Figure 4:
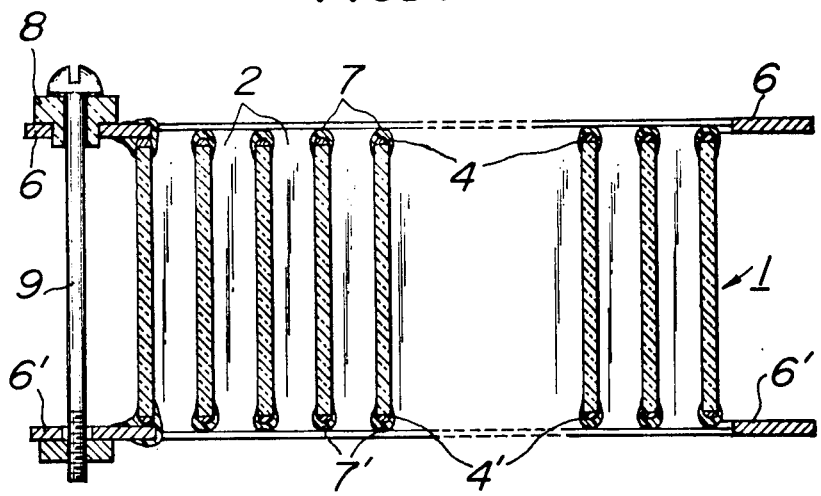
FIG. 4 is an enlarged section along line IV—IV in FIG. 3, a part of which is omitted.

On both surfaces 3 and 3' of a PTC ceramic article of a honeycomb structure composed of barium titanate and provided with channels as shown in FIG. 1 (in the drawings, the channels are shown by enlarging for clarity) is coated silver paste consisting of silver powder, at least one metal powder selected from the group consisting of tin, zinc, indium, gallium, antimony, bismuth and cadium, a glass powder having a low melting point (softening temperature: about 370°–430° C), an organic binder, such as alkyd resin and an organic solvent, such as pine oil and so on. The coated silver paste is baked at a temperature of about 400°–650° C to form ohmic electrodes 4 and 4' consisting mainly of silver as a metallic component and having a surface resistivity of the electrode per se of not more than 10 mΩ/cm$^2$. Then as shown in FIG. 2, lead electrodes 5 and 5' are soldered at one or more portions on said ohmic electrodes 4 and 4' or as shown in FIG. 4, circular lead electrodes 6 and 6' are mounted at the circumferences of said ohmic electrodes 4 and 4' and the lead electrodes 6 and 6' mechanically tightly contacted to the ohmic electrodes 4 and 4' through insulating washers 8 by bolts 9. Thereafter the ohmic electrodes are coated with electrical insulating and thermostable coatings 7 and 7', such as silicone resin and/or polyimide resin and the like, which can endure a temperature of 150°–200° C (which is the temperature when the heating element of PTC ceramic article is used) by spraying or dipping and the applied coating is baked as shown in FIGS. 2 and 4, whereby the heating elements of the present invention are constituted. The surface resistivity of the ohmic electrodes per se is influenced by the component of the paste, the baking condition, the thickness of the ohmic electrode and the like, but in order to maintain the surface resistivity of the ohmic electrode per se to not more than 10 m$\Omega$/cm$^2$, it is preferable to use the paste consisting mainly of silver as a metallic component, to which powdery tin and/or zinc are added. Tin and/or zinc give the silver ohmic electrode relatively lower surface resistivity than the other metals. These added metals give an ohmic property to silver electrodes. Furthermore, the volume resistivity of the ohmic electrode obtained by baking the paste consisting mainly of silver as a metallic component becomes larger by about 7–8 times than that of the silver layer obtained by baking the paste of silver alone as a metallic component, so that in order to obtain the ohmic electrode having a low surface resistivity of not more than 10 m$\Omega$/cm$^2$ by a small amount of paste consisting mainly of silver as a metallic component, it is most preferable that after a paste consisting mainly of silver and containing tin, zinc and so on as a metallic component is coated, a silver paste layer consisting of silver along as a metallic component is coated thereon and then baked.

The above described silver paste consists of 50–83% by weight of the metal powders, 2–10% by weight of the glass powder and 15–40% by weight of the mixture of the organic binder and the organic solvent.

The baking temperature is preferred to be a temperature range of 400°–650° C and further the surface resistivity can be made to be not more than 10 m$\Omega$/cm$^2$ by coating the paste consisting mainly of silver as a metallic component and the above described silver paste layer in a plurality of times and baking the formed laminated layers and the surface resistivity of the ohmic electrode per se may be made to be not more than 10 m$\Omega$/cm$^2$ by selecting these conditions conveniently.

The reason why the surface resistivity is limited to not more than 10 m$\Omega$/cm$^2$ is as follows. The inventors have found that when the surface resistivity exceeds 10 m$\Omega$/cm$^2$, even if an electrical insulating and thermostable coating to prevent the degradation of the ohmic electrode is applied, the degradation of the ohmic electrode proceeds in a short time as mentioned in the following examples and the durable life becomes short and the practically useful heating element cannot be obtained. When the surface resistivity is not more than 5 m$\Omega$/cm$^2$, the durable life becomes longer and such a case is most preferable.

As the electrical insulating and thermostable coating, silicone resin and/or polyimide resin which are stable against the temperature when the heating element of a PTC ceramic article is used, are preferable. As the process for applying the electrical insulating and thermostable coatings, the spraying and the dipping may be used as mentioned above. The processes for applying the coating to manufacture the heating element of the present invention will be more concretely explained hereinafter.

The ohmic electrode is applied and then the electrical insulating and thermostable coating is applied on the ohmic electrode and thereafter lead electrodes are contacted and connected mechanically to the ohmic electrodes prior to the baking and then the coating is baked and hardened while maintaining the heating element in such a state.

The ohmic electrodes are applied and electrical insulating and thermostable coating is applied on said ohmic electrodes and the coating is removed only at the portions where the lead electrodes are to be contacted, after which the coating is baked and then the lead electrodes are contacted with the portions where the coatings have been removed.

The ohmic electrodes are applied and the lead electrodes are soldered at one or more portions per one surface of the ohmic electrodes and then the electrical insulating and thermostable coating is applied on the surfaces of the ohmic electrodes and the lead electrodes, after which the coating is baked.

The ohmic electrodes are applied and the lead electrodes are mechanically contacted and connected to the ohmic electrodes, after which the electrical insulating and thermostable coating is applied on the ohmic electrodes and the lead electrodes while maintaining the heating element in such a state and then the coating is baked.

It is preferable that the electrical insulating and thermostable coating has a thickness of at least 5 $\Omega$m. The upper limit of the thickness of the coating varies with the dimensions of the heating element.

EXAMPLES

Figure 3:
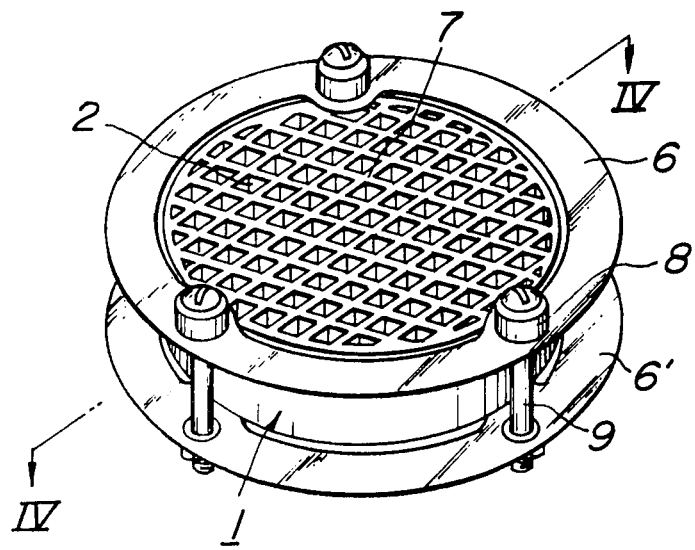
FIG. 3 is a perspective view of a heating element of another embodiment of the present invention, in which circular lead electrodes are tightly contacted.

On both end surfaces a PTC ceramic article of a honeycomb structure having a diameter of 38 mm and a thickness of 7 mm and composed of barium titanate having curie temperature of 200° C, at which the resistance is rapidly increased, in which 60 /cm$^2$ of square channels in section were provided, were coated with pastes consisting mainly of silver as a metallic component, which consist of 67% by weight of mixed metal powder having the content as disclosed in the following table, 4% weight of glass powder having a softening temperature of 400° C and 29% by weight of the total amount of an alkyd resin and pine oil (an organic solvent) in the coating times as disclosed in the following table and the coated pastes were baked at the temperature as disclosed in the following table to obtain ohmic electrodes and then circular lead electrodes as shown in FIG. 3 were provided, after which a silicone resin varnish (Silox Sealing Enamel (FUJI KOBUNSHI KOGYO LTD.)) was applied on the ohmic electrodes two times by dipping and the coated silicone resin varnish was baked at 250° C for 1 hour to obtain the heating elements of the present invention No. 1 to No. 11.

On both end surfaces of the same PTC ceramic article composed of barium titanate as described above were coated with the paste consisting mainly of silver as a metallic component to the coating thickness as described in the following table in one or two times and then a paste layer consisting of silver alone as the metal component was coated in one to three times and then the baking was effected to form the ohmic electrodes and a lead electrode is soldered at one portion per one side surface by means of a high temperature soft solder Pb-Ag containing silver and then the above described Silox was applied thereon and the coated resin was baked to obtain the heating elements of the present invention No. 12 14 No. 28.

Furthermore, samples in which the surface resistivity of the ohmic electrode exceeds 10 m$\Omega$/cm$^2$ or the electrical insulating the thermostable coating is not provided, are shown in reference samples No. 29 – No. 38 for comparison. Samples in which the ohmic electrode is hot sprayed with aluminum and which have been already known, are shown in sample No. 39 – No. 41, as the conventional heating elements.

In these reference samples and the conventional samples, the circular lead electrode as whown in FIG. 3 was provided.

The results obtained by comparing these properties are shown in the following table.

Table

| | Sample No. | Content of metal component (Wt. %) Under layer Ag | Sn | Zn | In | Ga | Sb | Bi | Cd | Cover layer Ag | Coating tims of paste Under layer | Cover layer | Thickness of ohmic electrode (μm) | surface resistivity (mΩ/cm²) | Baking temperature (°C) | Presence of insulating coating | Increase* percent of surface resistivity of ohmic electrode (%) | Time until** Cracks are formed on ohmic electrode and heat generation cannot be effected (hrs.) | Estimation |
|---|---|---|---|---|---|---|---|---|---|---|---|---|---|---|---|---|---|---|---|
| Present invention | 1 | 82 | 18 | | | | | | | | 4 | | 38 | 9.6 | 550 | have | 3 | >2,000 | good |
| | 2 | 94 | 6 | | | | | | | | 5 | | 50 | 2.3 | 550 | have | 2 | >2,000 | good |
| | 3 | 82 | 18 | | | | | | | | 5 | | 49 | 8.2 | 550 | have | 3 | >2,000 | good |
| | 4 | 80 | 20 | | | | | | | | 5 | | 47 | 9.7 | 550 | have | 3 | >2,000 | good |
| | 5 | 82 | 18 | | | | | | | | 6 | | 61 | 6.5 | 550 | have | 2 | >2,000 | good |
| | 6 | 82 | 18 | | | | | | | | 6 | | 69 | 5.6 | 570 | have | 2 | >2,000 | good |
| | 7 | 82 | 18 | | | | | | | | 7 | | 37 | 9.3 | 550 | have | 3 | >2,000 | good |
| | 8 | 82 | 10 | 8 | | | | | | | 4 | | 52 | 3.7 | 550 | have | 2 | >2,000 | good |
| | 9 | 89 | 5 | 6 | | | | | | | 5 | | 64 | 8.9 | 540 | have | 3 | >2,000 | good |
| | 10 | 80 | | 14 | | | | | | | 6 | | 58 | 8.5 | 470 | have | 3 | >2,000 | good |
| | 11 | 87 | 13 | 9 | | | | | | | 6 | | 40 | 5.5 | 550 | have | 3 | >2,000 | good |
| | 12 | 82 | 9 | | | 6 | | | | | 6 | | 22 | 5.2 | 560 | have | 2 | >2,000 | good |
| | 13 | 96 | 18 | | | | 2 | 1 | | | 4 | | 32 | 2.2 | 540 | have | 2 | >2000 | good |
| | 14 | 82 | 4 | | | | | | | | 1 | 2 | 30 | 2.7 | 540 | have | 1 | >2,000 | good |
| | 15 | 79 | 21 | | | | | | | 100 | 1 | 2 | 29 | 2.9 | 540 | have | 1 | >2000 | good |
| | 16 | 82 | 18 | | | | | | | 100 | 1 | 2 | 38 | 1.9 | 550 | have | 1 | >2,000 | good |
| | 17 | 92 | 15 | 3 | | | | | | 100 | 1 | 3 | 30 | 2.0 | 550 | have | 2 | >2,000 | good |
| | 18 | 82 | 2 | 6 | | | | | | 100 | 1 | 2 | 29 | 2.6 | 550 | have | 1 | >2,000 | good |
| | 19 | 77 | 13 | 10 | | | | | | 100 | 1 | 2 | 28 | 2.9 | 550 | have | 2 | >2,000 | good |
| | 20 | 95 | | 5 | | | | | | 100 | 1 | 2 | 29 | 1.8 | 530 | have | 1 | >2,000 | good |
| | 21 | 82 | | 18 | | | | | | 100 | 1 | 2 | 33 | 2.4 | 530 | have | 1 | >2,000 | good |
| | 22 | 76 | | 24 | | | | | | 100 | 1 | 2 | 31 | 2.8 | 530 | have | 2 | >2,000 | good |
| | 23 | 82 | 18 | | | | | | | 100 | 1 | 1 | 31 | 4.4 | 540 | have | 1 | >2,000 | good |
| | 24 | 82 | 18 | | | | | | | 100 | 1 | 2 | 42 | 2.1 | 540 | have | 2 | >2,000 | good |
| | 25 | 82 | 18 | | | | | | | 100 | 2 | 3 | 54 | 1.8 | 550 | have | 1 | >2,000 | good |
| | 26 | 85 | 10 | | 3 | 1 | | | | 100 | 2 | 2 | 34 | 3.0 | 460 | have | 2 | >2,000 | good |
| | 27 | 82 | 10 | | 5 | 1 | | 2 | | 100 | 1 | 1 | 31 | 3.1 | 460 | have | 1 | >2,000 | good |
| | 28 | 82 | 8 | | | 5 | | | 3 | 100 | 1 | 2 | 32 | 2.8 | 460 | have | 2 | >2,000 | good |
| | 29 | 77 | 18 | | 100 | | | | | | 1 | 2 | 11 | 38 | 520 | have | 94 | 600 | bad |
| | 30 | 82 | 18 | | | | | | | | 2 | | 20 | 19 | 520 | have | 65 | 600 | bad |
| | 31 | 82 | 18 | | | | | | | | 3 | | 29 | 14 | 530 | have | 23 | 650 | bad |
| Reference | 32 | 82 | 18 | | | | | | | | 1 | | 10 | 42 | 520 | no | — | 250 | bad |
| | 33 | 82 | 18 | | | | | | | | 2 | | 18 | 22 | 520 | no | — | 300 | bad |
| | 34 | 82 | 18 | | | | | | | | 3 | | 32 | 13 | 530 | no | — | 300 | bad |
| | 35 | 82 | 18 | | | | | | | | 5 | | 50 | 7.9 | 550 | no | >100 | 400 | bad |
| | 36 | 82 | 18 | | | | | | | | 7 | | 73 | 5.5 | 570 | no | >100 | 450 | bad |
| | 37 | 82 | 18 | | | | | | | 100 | 1 | 2 | 32 | 2.5 | 550 | no | 48 | 500 | bad |
| | 38 | 82 | 18 | | | | | | | 100 | 2 | 1 | 29 | 4.6 | 550 | no | >100 | 450 | bad |
| | 39 | | | | | | | | | | | Aluminum layer is deposited even on inner portion of channels | 16 | 7.1 | — | no | — | 350 | bad |
| Conventional heating elements | 40 | | | | | | | | | | | | 22 | 5.3 | — | no | >100 | 400 | no good*** |
| | 41 | | | | | Aluminum hot spray | | | | | | | 42 | 2.6 | — | no | 60 | >2,000 | no good*** |
| | 42 | | | | | | | | | | | | 63 | 1.9 | — | no | 13 | >2,000 | no good*** |
| | 43 | | | | | | | | | | | | 85 | 1.5 | — | no | 7 | >2,000 | no good*** |

Note:
*Increase percent of surface resistivity of electrode per se in total 400 hours of flowing electric current when 100 V of AC is applied for 5 minutes and then interrupted for 5 minutes.
**Time of flowing electric current until heat generation become impossible in the test when 100 V of AC is applied for 5 minutes and then is interrupted for 5 minutes.
***Deposited area of ohmic electrode on inner portion of channels is large, cross-sectional area of channels is considerably small and pressure loss of air is large.

As seen from the above table, the increase percent of the surface resistivity of the heating elements of the present invention No. 1 – No. 28 in which the eletrical insulating and thermostable coating is applied on the ohmic electrode consisting mainly of silver as a metallic component and having a surface resistivity of the electrode per se of not more than 10 mΩ/cm² is noticeably smaller than that of the heating elements No. 32 – No. 38 of the reference. samples, in which the electrical insulating and thermostable coating is not provided and the heating elements No. 29 – No. 34 in which the surface resistivity exceeds 10 mΩ/cm² and the conventional heating elements, and the heating elements of the present invention can be safely used for a long time without forming cracks on the ohmic electrode even after using for 2,000 hours and making the heat generation impossible but the other heating elements except for the conventional heating elements No. 41 – No. 43 form cracks on the ohmic electrode in 250–650 hours and the heat generation becomes impossible and these heating elements are unstable.

The samples of No. 41 – No. 43 among the conventional heating elements, the heat generation is possible for more than 2,000 hours but the amount of the ohmic electrode on the inner portion of the channels due to the aluminum hot spraying is large and the cross-sectional area of the channels becomes very small and the pressure loss of air is large and these heating elements are not preferable.

As mentioned above, the heating elements of the present invention are very small in the increase of the surface resistivity of the ohmic electrode per se by the synergistic effect obtained by applying the ohmic electrode consisting mainly of silver and having a surface resistivity of electrode per se of not more than 10 mΩ/cm² and an electrical insulating and thermostable coating on the surface of the ohmic electrode and are stable for a long time. These heating elements can be used for a hair dryer, air heater, or clothes dryer and are very commercially useful.

What is claimed is:

1. A heating element comprising a ceramic article of a honeycomb structure having a positive temperature coefficient of electrical resistance and composed of barium titanate in which a pair of ohmic electrodes consisting mainly of silver as a metallic component and having a surface resistivity of the electrode per se of not more than 10 mΩ/cm² are provided on both end surfaces of the ceramic article of the honeycomb structure provided with a multiplicity of parallel channels extending therethrough and an electrically insulating and thermostable coating is applied on said ohmic electrodes.

2. The heating element as claimed in claim 1, wherein the ohmic electrode comprising a first layer having ohmic contact with the ceramic article and a second layer applied on the first layer and having a smaller surface resistivity than the first layer.

3. The heating element as claimed in claim 2, wherein the second layer is composed of silver alone, as a metallic component.

4. The heating element as claimed in claim 1, wherein the ohmic electrode consisting mainly of silver consists of 75–95% by weight of silver and 25–3% by weight of at least one metal selected form the group consisting of tin, zinc, indium, gallium, antimony, bismuth and cadmium, as a metallic component.

5. The heating element as claimed in claim 4, wherein the metal is tin.

6. The heating element as claimed in claim 4, wherein the metal is tin and zinc.

7. The heating element as claimed in claim 1, wherein the surface resistivity is not more than 5 mΩ/cm².

8. The heating element as claimed in claim 1, wherein the coating is at least one resin selected from the group consisting of silicone resin and polyimide resin.

9. The heating element as claimed in claim 8, wherein the coating is silicone resin.

10. The heating element as claimed in claim 8, wherein the coating is polyimide resin.

11. The heating element as claimed in claim 1, wherein a lead electrode electrically connecting to the ohmic electrode is also coated with electrically insulating and thermostable layer.

* * * * *